(No Model.)
E. P. THORNTON.
HARNESS.
No. 281,738. Patented July 24, 1883.
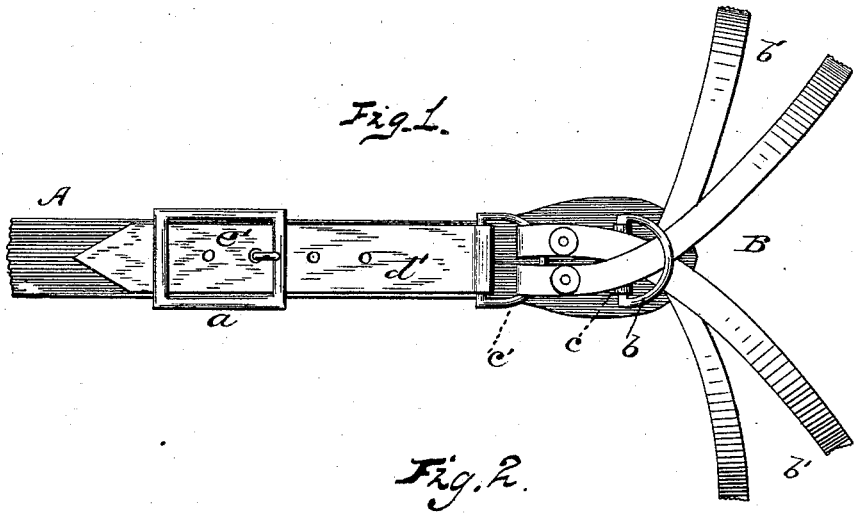
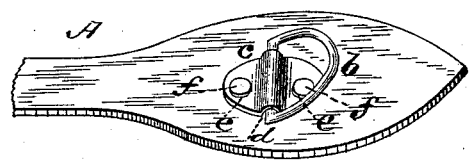
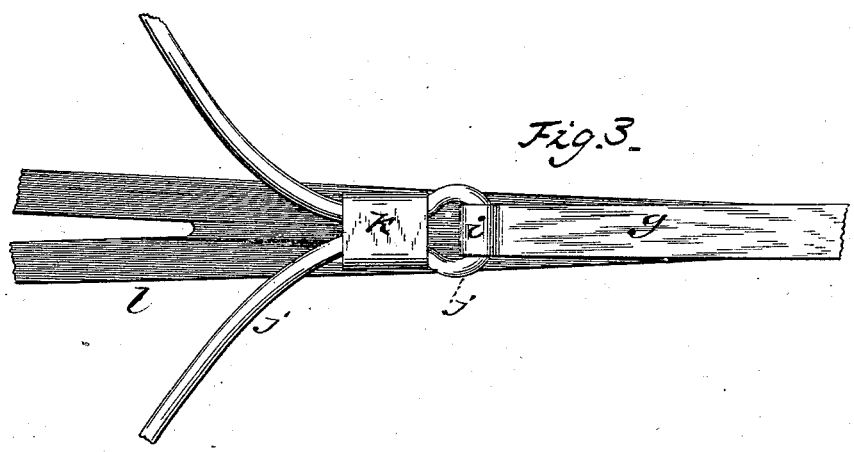
Witnesses
Chas. R. Burr
W. E. Bowen
Inventor
E. P. Thornton.
by Wm. H. Bates & Co
his Attorneys

UNITED STATES PATENT OFFICE.

EDWIN P. THORNTON, OF YELLOW SPRINGS, OHIO.

HARNESS.

SPECIFICATION forming part of Letters Patent No. 281,738, dated July 24, 1883.

Application filed May 19, 1883. (No model.)

*To all whom it may concern:*

Be it known that I, EDWIN P. THORNTON, a citizen of the United States, residing at Yellow Springs, in the county of Greene and State of Ohio, have invented certain new and useful Improvements in Harness, of which the following is a specification, reference being had therein to the accompanying drawings.

This invention has relation to improvements in harness; and it consists in providing the back-strap with a guide or ring that is secured thereto by a metal plate having perforations in each end and a transverse groove in its center, which plate is secured to said strap and adapted to connect the breeching and strap to one another, whereby the former may be adjusted to different-sized horses, all as will be hereinafter more fully explained.

The annexed drawings, to which reference is made, fully illustrate my invention, in which—

Figure 1 is a plan view of my device. Fig. 2 is a perspective view, and Fig. 3 is a modification, of my device.

Referring by letter to the accompanying drawings, A designates the back-strap of the harness, which is provided with a buckle, $a$, near the rump portion thereof, and at the rear end of said strap the same is provided with a ring, $b$, that is secured thereto by a metal plate, $c$, having a transverse groove, $d$, in its center, in which the D-ring is secured. Said plate is constructed with perforations $e\ e$ in each end, through which rivets $f\ f$ are inserted, that also pass through the back-strap, whereby the plate and strap, as well as the ring, are secured to one another.

The letter B represents the hip-straps, which are four in number, and the ends $b'$ are to be secured to the breeching without the use of buckles, while the opposite ends of said hip-straps are connected to a ring, $c'$, secured to a strap, $d'$, the forward end, $e'$, of which is perforated to engage the buckle $a$ on the back-strap aforesaid.

It will be observed from the foregoing description, and by reference to the annexed drawings, that the operation of adjusting the breeching to different-sized horses is very simple, the single buckle $a$ on the back-strap serving to hold the breeching in position, and in adjusting the breeching to suit the size of the horse the strap $d'$ is let out or taken up, as may be required; and it will be further seen that the ring $b$ is a guide for the hip-straps, and at the same time holds them in place, and by this construction all side buckles of the breeching are dispensed with, the same being objectionable on account of the animal's tail being caught therewith, and a harness constructed as herein described is cheap to manufacture and durable.

In Fig. 3 of the drawings I have shown the device in a modified form, the same being provided with a strap, $g$, to connect with the back-strap buckle, and the rear end of said strap $g$ having a loop, $i$, through which passes the hip-strap $j$, which is made of one piece of material and connects on each side of the horse with the breeching. Said hip-strap passes through a guide-loop, $k$, on the back-strap, and the breeching can be adjusted by such construction in a manner similar to that shown in Fig. 1 of the drawings; and it will be noticed that this construction, as well as that shown in Fig. 1, is applicable to single as well as double harness, and can be made light or heavy, as desired.

I am aware that prior to my invention loops or similar devices have been used through which the hip-straps pass and are retained in position; but this I do not broadly claim; but, Having described my invention, what I claim, and desire to secure by Letters Patent, is—

In a harness, the combination, with the back-strap A, provided with the buckle $a$, of the guide-ring $b$, secured to said strap by the plate $c$, having transverse groove $d$ and perforations $e\ e$ to receive the rivets $f\ f$, whereby the same is secured to the strap A, and adapted to receive the breeching hip-straps, thereby serving as a guide and retainer for said hip-straps, as shown and described, and for the purpose specified.

In testimony whereof I affix my signature in presence of two witnesses.

EDWIN P. THORNTON.

Witnesses:
   W. H. HAWKINS,
   L. MUSSELMAN.